(12) United States Patent
Ellis et al.

(10) Patent No.: US 8,851,846 B2
(45) Date of Patent: Oct. 7, 2014

(54) APPARATUS AND METHODS FOR COOLING PLATFORM REGIONS OF TURBINE ROTOR BLADES

(75) Inventors: Scott Edmond Ellis, Easley, SC (US); Daniel Alan Hynum, Simpsonville, SC (US); John Wesley Harris, Jr., Taylors, SC (US)

(73) Assignee: General Electric Company, Schenectady, NY (US)

( * ) Notice: Subject to any disclaimer, the term of this patent is extended or adjusted under 35 U.S.C. 154(b) by 1043 days.

(21) Appl. No.: 12/894,878

(22) Filed: Sep. 30, 2010

(65) Prior Publication Data

US 2012/0082564 A1   Apr. 5, 2012

(51) Int. Cl.
*F01D 5/18* (2006.01)
*F01D 5/30* (2006.01)
*F01D 5/08* (2006.01)

(52) U.S. Cl.
CPC ............ *F01D 5/081* (2013.01); *F05D 2240/81* (2013.01); *Y02T 50/676* (2013.01); *F05D 2250/185* (2013.01); *F05D 2250/184* (2013.01); *F05D 2260/201* (2013.01); *F01D 5/3007* (2013.01)
USPC ..................... 416/97 R; 416/96 R; 416/193 A

(58) Field of Classification Search
USPC .... 415/115; 416/95, 96 R, 96 A, 97 R, 193 A
See application file for complete search history.

(56) References Cited

U.S. PATENT DOCUMENTS

| | | |
|---|---|---|
| 3,950,114 A | 4/1976 | Helms |
| 4,712,979 A | 12/1987 | Finger |
| 4,798,514 A | 1/1989 | Pask |
| 5,340,278 A | 8/1994 | Magowan |
| 5,382,135 A | 1/1995 | Green |
| 5,813,835 A | 9/1998 | Corsmeier et al. |
| 6,017,819 A | 1/2000 | Brigham et al. |
| 6,019,579 A | 2/2000 | Fukuno et al. |
| 6,071,075 A * | 6/2000 | Tomita et al. ............... 416/97 R |
| 6,120,249 A | 9/2000 | Hultgren et al. |
| 6,190,130 B1 | 2/2001 | Fukue et al. |
| 6,196,799 B1 | 3/2001 | Fukue et al. |
| 6,402,417 B1 | 6/2002 | Okamoto |
| 6,431,833 B2 | 8/2002 | Jones |
| 6,478,540 B2 | 11/2002 | Abuaf et al. |
| 7,097,424 B2 | 8/2006 | Cunha et al. |
| 7,147,439 B2 | 12/2006 | Jacala et al. |
| 7,198,467 B2 | 4/2007 | Keith et al. |
| 7,347,664 B2 | 3/2008 | Kayser et al. |
| 7,416,391 B2 | 8/2008 | Veltre et al. |
| 2006/0056968 A1 | 3/2006 | Jacala et al. |
| 2006/0269409 A1 * | 11/2006 | Torii et al. ................... 416/97 R |
| 2007/0189896 A1 | 8/2007 | Itzel et al. |
| 2009/0202339 A1 * | 8/2009 | Torii et al. ..................... 415/115 |

* cited by examiner

*Primary Examiner* — Christopher Verdier
(74) *Attorney, Agent, or Firm* — Mark E. Henderson; Ernest G. Cusick; Frank A. Landgraff

(57) ABSTRACT

A platform cooling arrangement in a turbine rotor blade having a platform that includes an interior cooling passage formed therein. The platform cooling arrangement may include: a main plenum residing just inboard of the planar topside and extending from an aft position to a forward position within one of the pressure side and the suction side of the platform, the main plenum having a longitudinal axis that is approximately parallel to the planar topside; a supply plenum that extends between the main plenum and the interior cooling passage; and a plurality of cooling apertures, each cooling aperture extending from one of the pressure side and the suction side slashface to a connection with the main plenum.

15 Claims, 9 Drawing Sheets

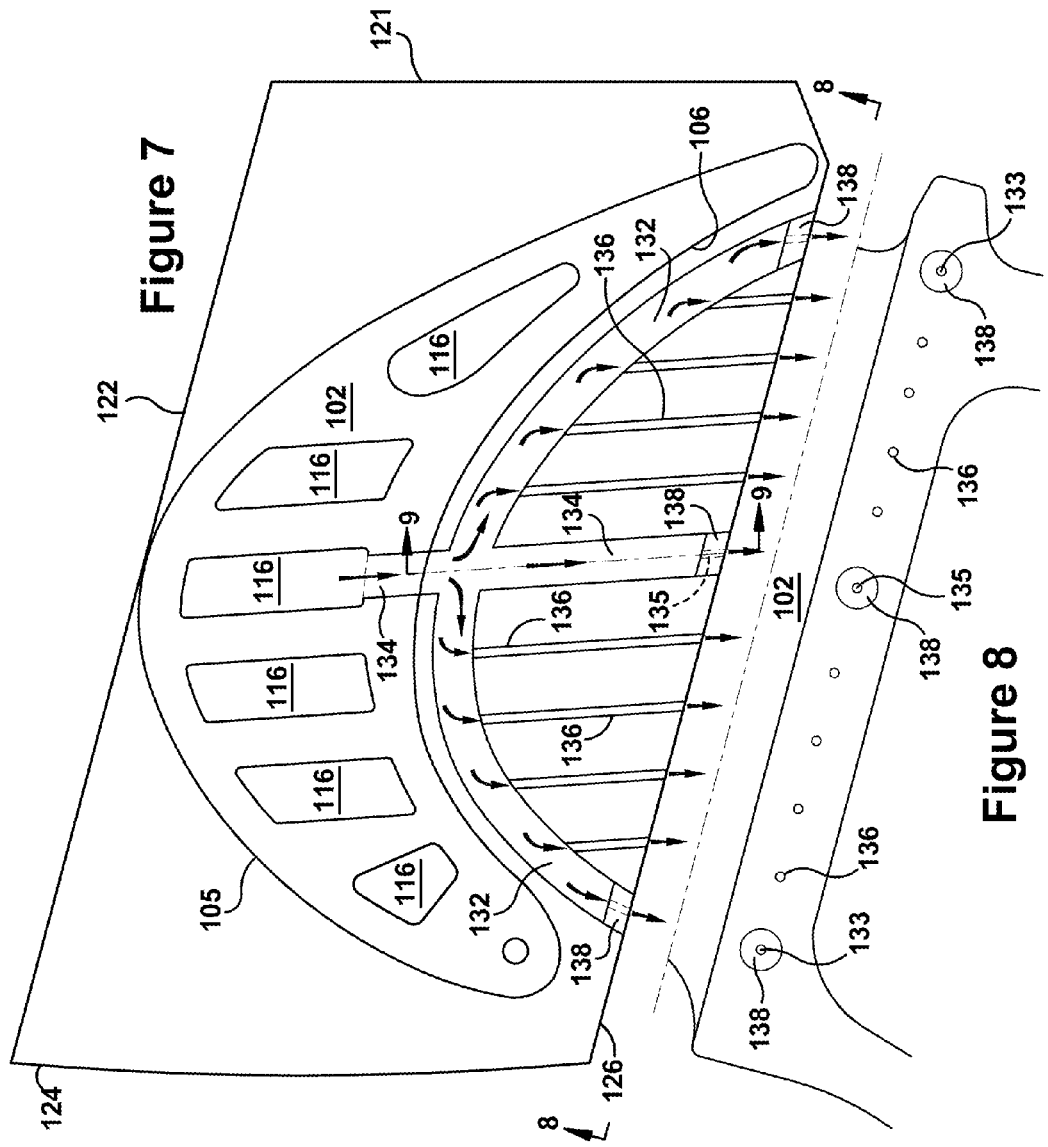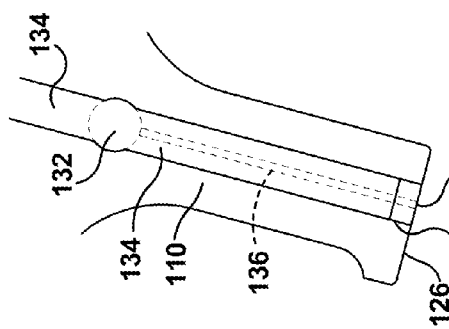

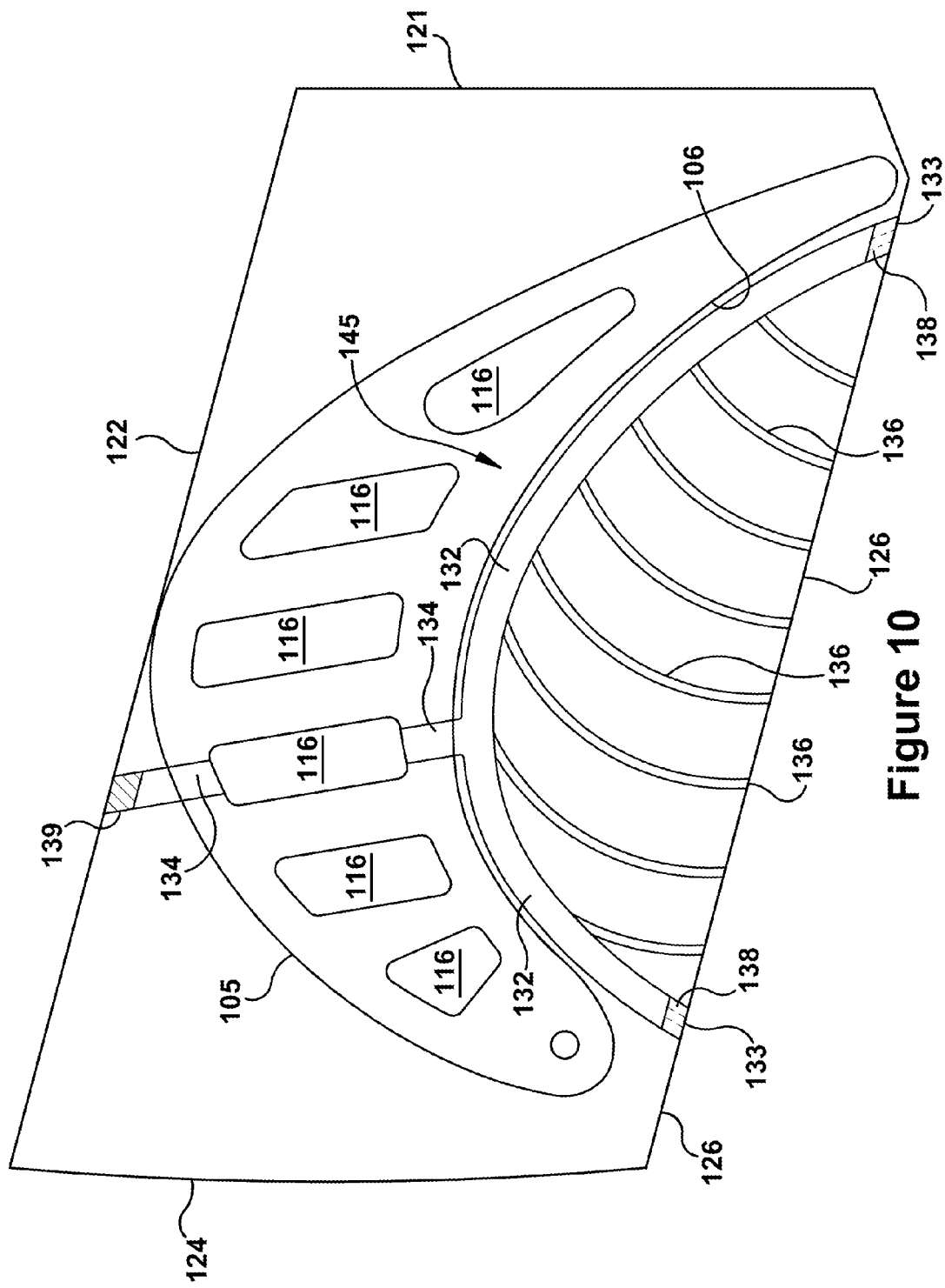

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4, 5, and 9) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface. The platform cooling arrangement may include: a main plenum residing just inboard of the planar topside and extending from an aft position to a forward position within one of the pressure side and the suction side of the platform, the main plenum having a longitudinal axis that is approximately parallel to the planar topside; a supply plenum that extends between the main plenum and the interior cooling passage; and a plurality of cooling apertures, each cooling aperture extending from one of the pressure side and the suction side slashface to a connection with the main plenum.

The present application further describes a method of creating a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, and wherein, along a side that coincides with a pressure side of the airfoil, a pressure side of the platform comprises a topside extending circumferentially from the airfoil to a pressure side slashface. The method comprising the steps of: forming a main plenum, the main plenum residing just inboard of the planar topside and extending from an aft position to a forward position within the pressure side of the platform, and having a longitudinal axis that is approximately parallel to the planar topside; machining a supply plenum along a predetermined linear path, the linear path having a starting location at an axially central location on the pressure side slashface and extending in an approximate circumferential direction such that the supply plenum forms a junction with the interior cooling passage and, therebetween, bisects the main plenum; and machining a plurality of cooling apertures, each comprising a starting location on the pressure side slashface and each extending in an approximate circumferential direction to a junction with the main plenum.

The present application further describes a method of creating a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface. The method may include the steps of: forming a main plenum via a casting process, the main plenum formed such that the main plenum resides just inboard of the planar topside, has a longitudinal axis that is approximately parallel to the planar topside, and arcs from an outlet formed at an aft position on the pressure side slashface to an outlet formed at a forward position on the pressure side slashface, wherein the arc curvature corresponds in shape to the contour profile of the pressure face of the airfoil; machining a supply plenum along a predetermined linear path, the linear path having a starting location at an axially central location on the suction side slashface and extending in an approximate circumferential direction such that the supply plenum forms a junction with the main plenum and, therebetween, bisects the interior cooling channel; and machining a plurality of cooling apertures, each comprising a starting location on the pressure side slashface and each extending in an approximate circumferential direction to a junction with the main plenum.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 7 illustrates a top with partial cross-sectional view of a platform of a turbine rotor blade having a cooling configuration according to an exemplary embodiment of the present invention;

FIG. 8 illustrates a front view from the vantage point along 8-8 of FIG. 7;

FIG. 9 illustrates a cross-sectional view along 9-9 of FIG. 7;

FIG. 10 illustrates a top with partial cross-sectional view of a turbine rotor blade having a platform cooling configuration according to an alternative embodiment of the present invention.

DETAILED DESCRIPTION OF THE INVENTION

Figure 1:
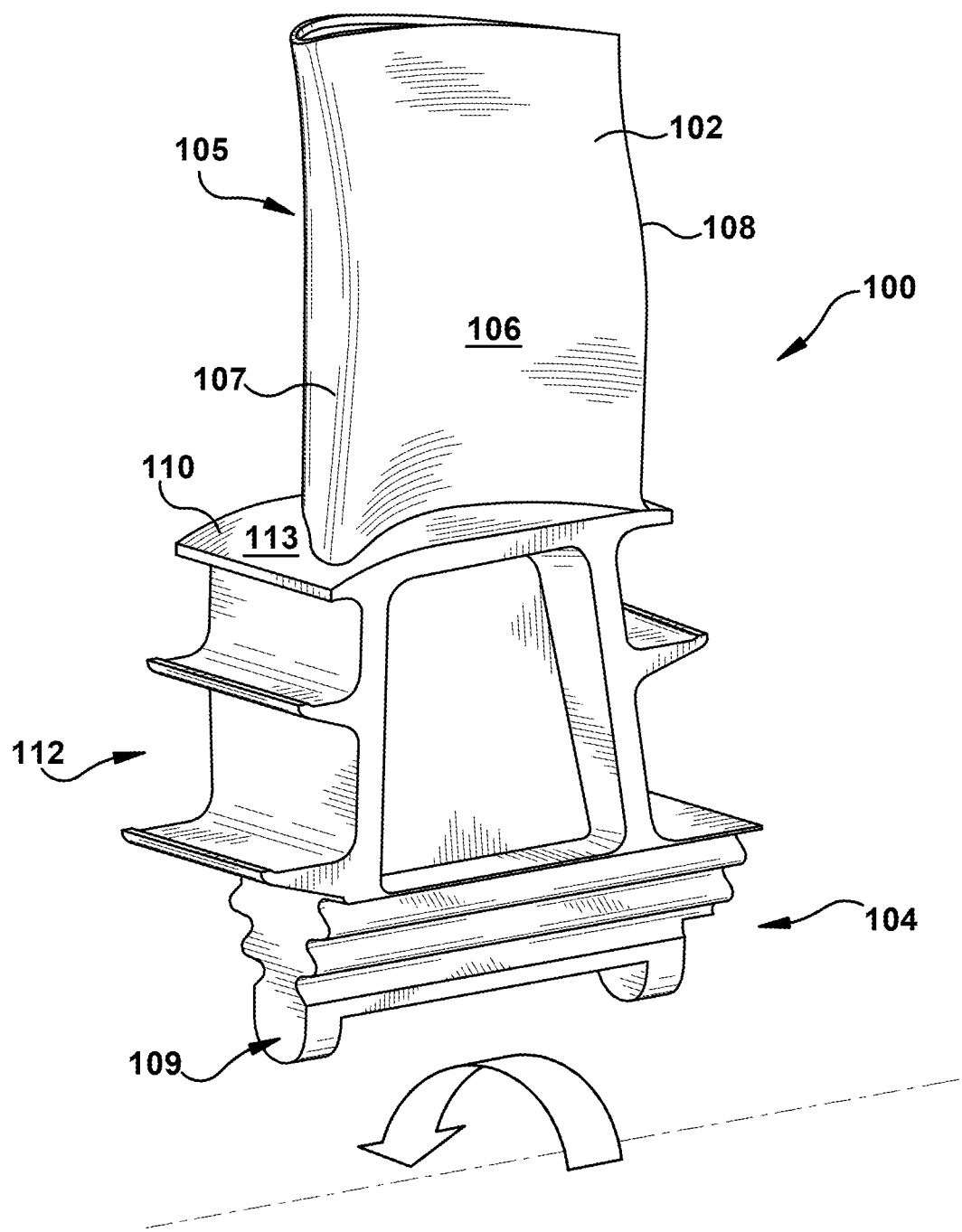
FIG. 1 illustrates a perspective view of an exemplary turbine rotor blade in which embodiments of the present invention may be employed.
Figure 2:
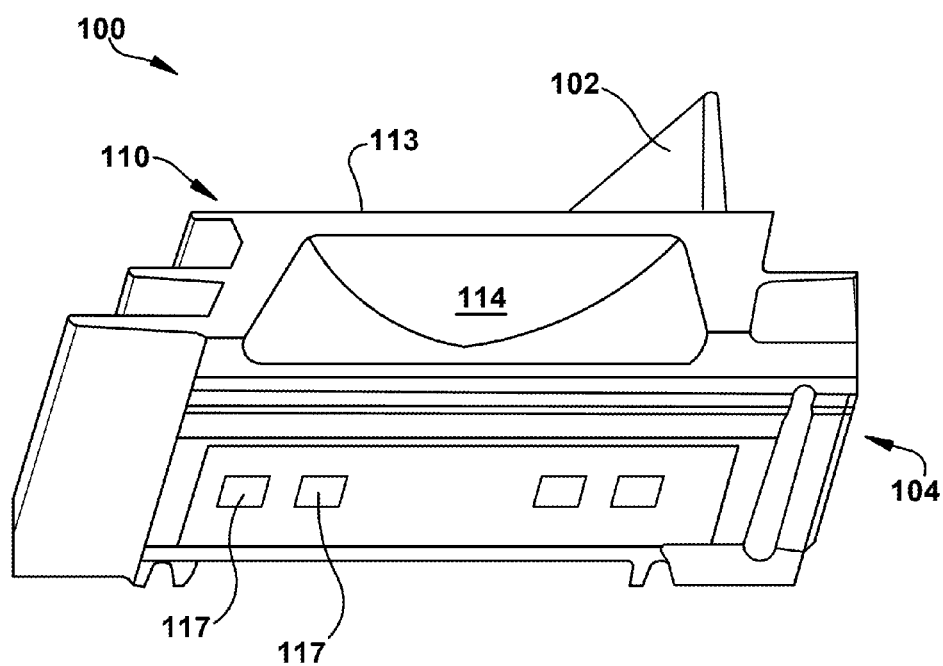
FIG. 2 illustrates an underside view of a turbine rotor blade in which embodiments of the present invention may be used.
Figure 3:
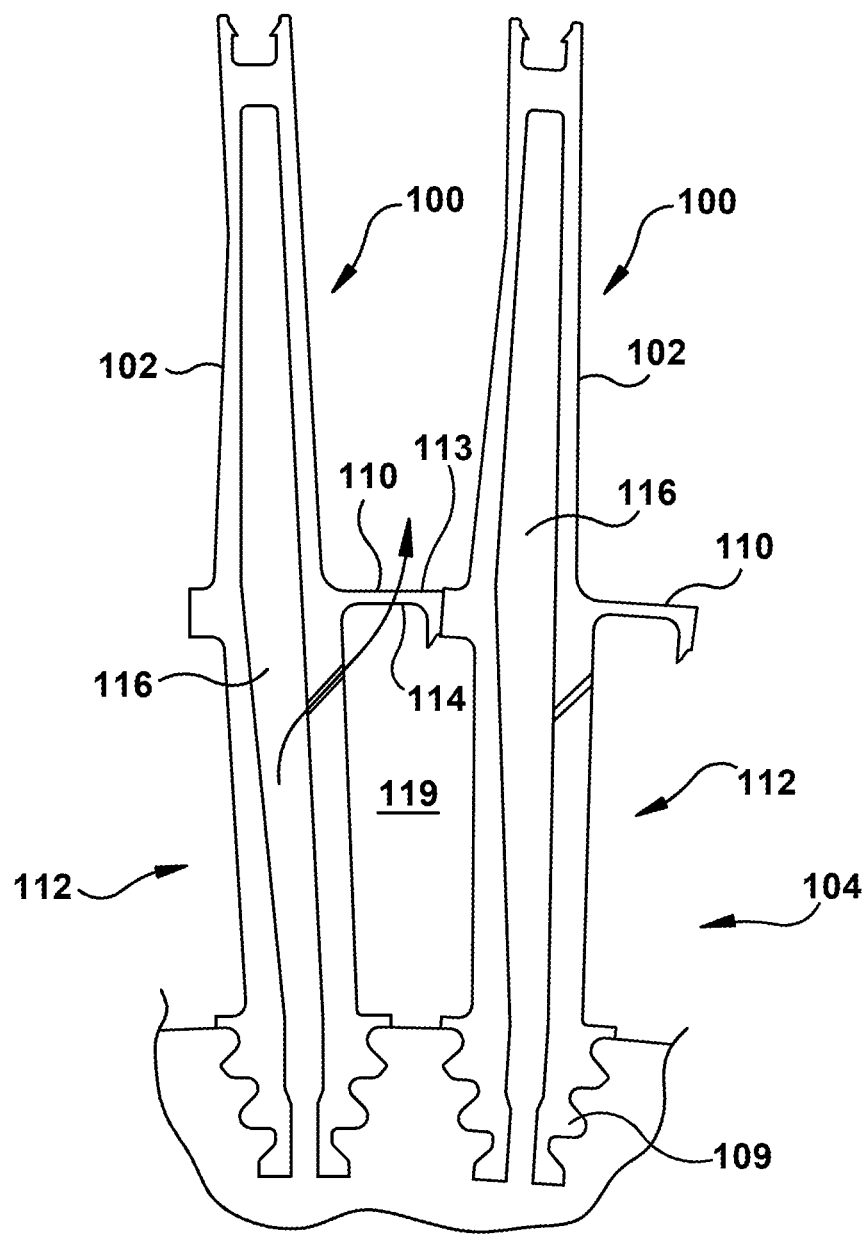
FIG. 3 illustrates a sectional view of neighboring turbine rotor blades having a cooling system according to conventional design.
Figure 4:
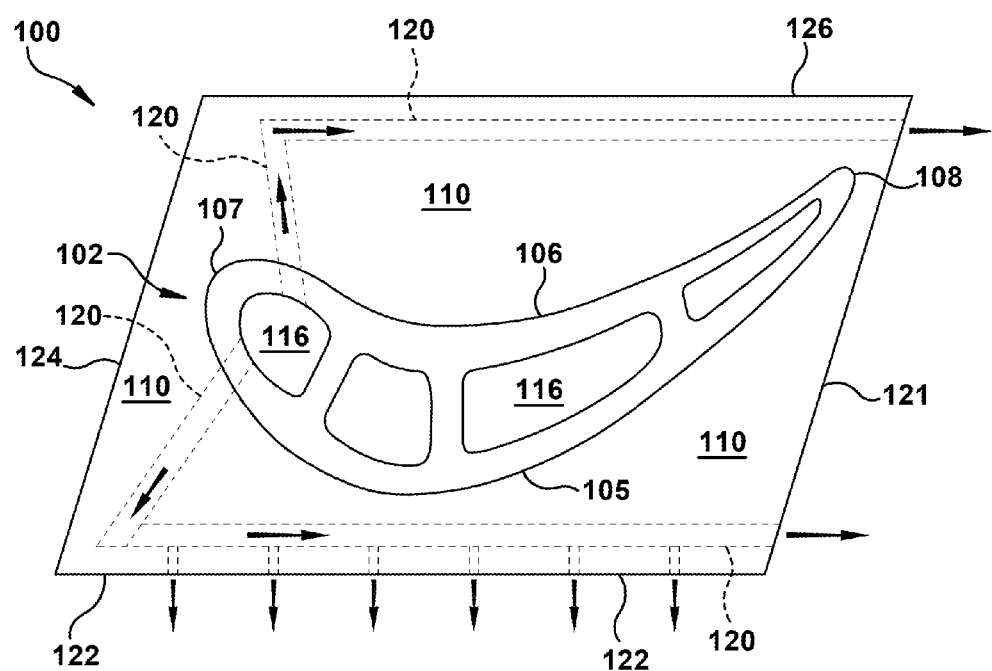
FIG. 4 illustrates a top view of a turbine rotor blade having a platform with interior cooling channels according to conventional design.
Figure 5:
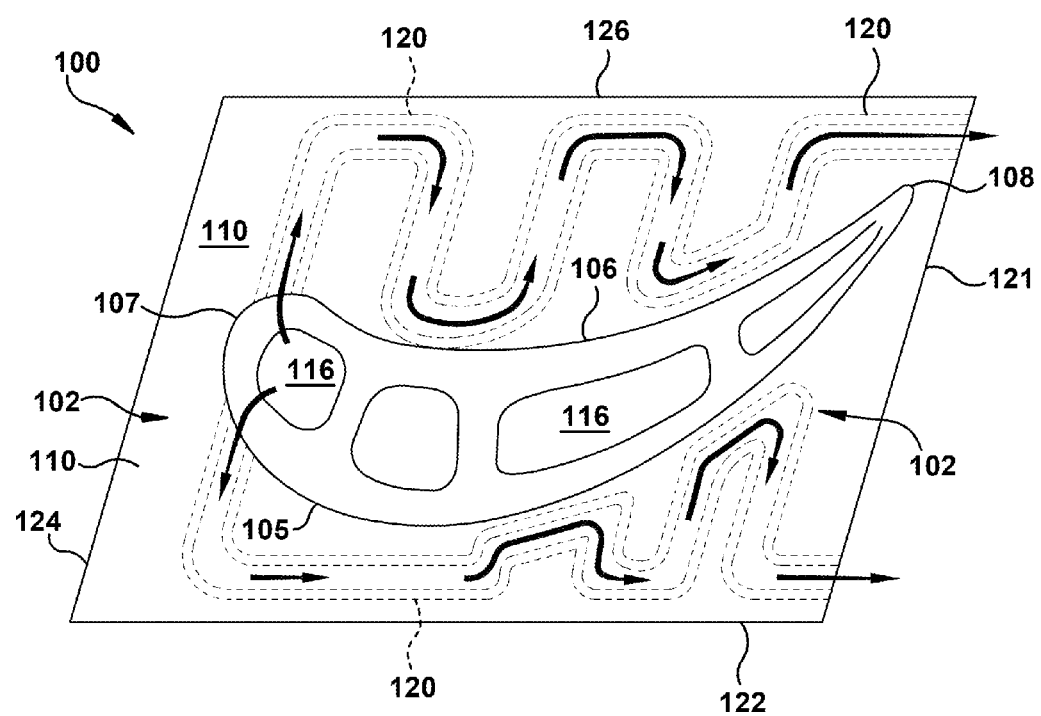
FIG. 5 illustrates a top view of a turbine rotor blade having a platform with interior cooling channels according to an alternative conventional design.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIG. 7, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 6:
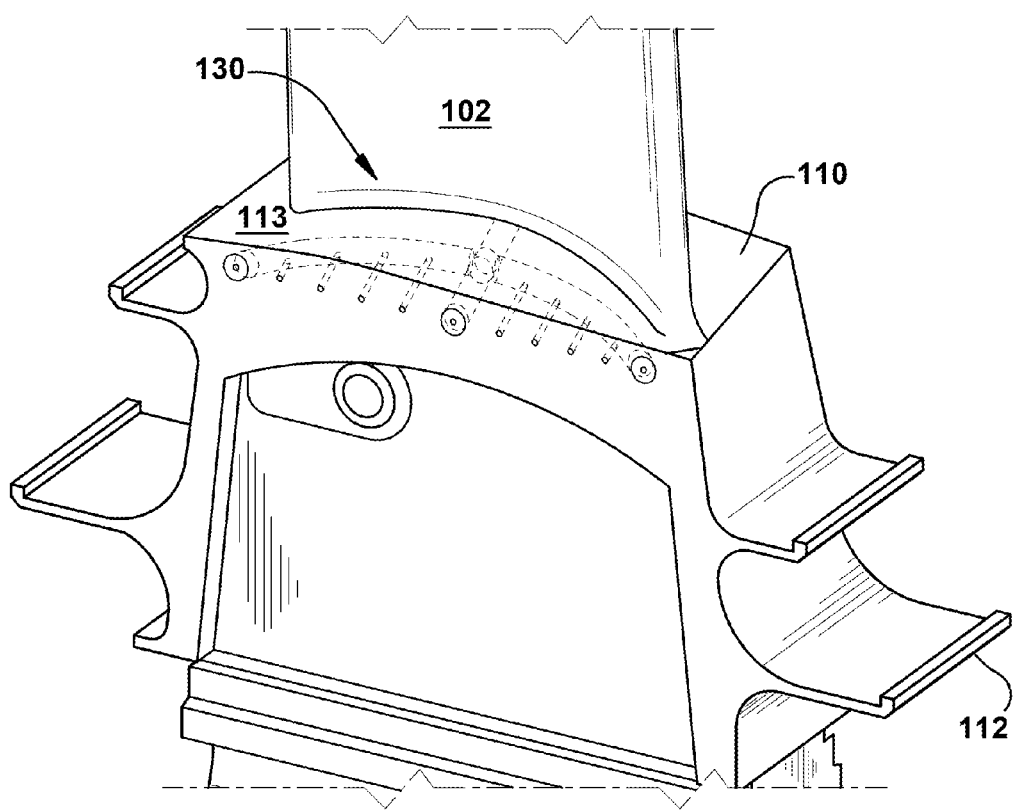
FIG. 6 illustrates a perspective view of a turbine rotor blade having a platform cooling configuration according to an exemplary embodiment of the present invention.
Figure 11:
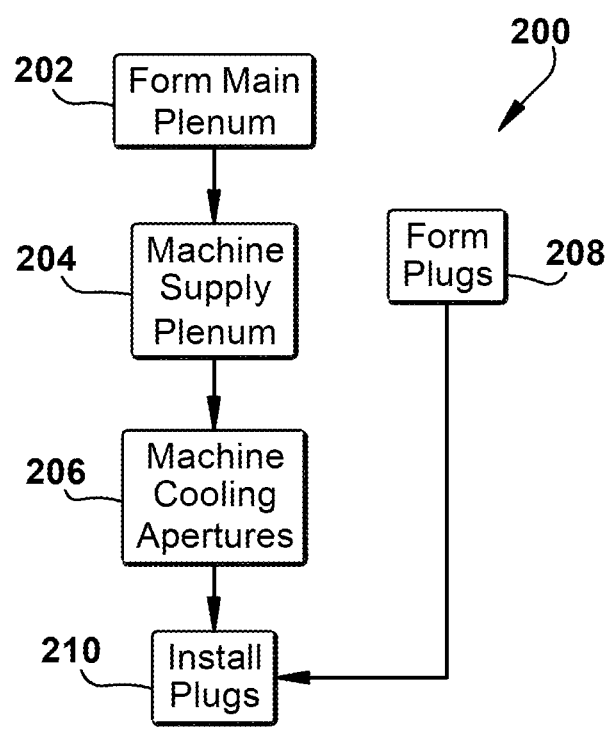
FIG. 11 illustrates an exemplary method of creating a platform cooling arrangement according to an exemplary embodiment of the present application.

Referring now to FIGS. 6 through 11, several views of exemplary embodiments of the present invention are provided. FIGS. 6 through 9, in particular, illustrate a turbine rotor blade 100 having a platform cooling configuration 130 according to a preferred embodiment of the present invention. As shown, the rotor blade 100 includes a platform 110 residing at the interface between an airfoil 102 and a root 104. The rotor blade 100 includes an interior cooling passage 116 that extends from the root 104 to at least the approximate radial height of the platform 110, and in most cases into the airfoil 102. At the side of the platform 110 that corresponds with a pressure face 106 of the airfoil 102, it will be appreciated that the platform 110 may have a planar topside 113 that extends from the airfoil 102 to a pressure side slashface 126. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) Also configured within the interior of the platform 110, an exemplary embodiment of the present invention may include: a main plenum 132; a supply plenum 134 that connects the main plenum 132 to the interior cooling passage 116; and a plurality of cooling apertures 136, through which coolant may be dispersed through the interior areas of the platform 110.

In regard to the main plenum 132, it may be formed just inboard of the planar topside 113 and may extend from an aft position to a forward position along the pressure side slashface 126 (though, it will be appreciated that forming the main plenum 134 as well as the other features described herein may be done similarly on the suction side of the platform 110 and along the suction side slashface 122). In addition, as illustrated, the main plenum 132 may be approximately parallel to the platform 110, i.e., the main plenum 132 may be a long and relatively narrow passageway and have a longitudinal axis that is parallel to the planar topside 126. In one embodiment, the main plenum 132 arcs from an aft position to a forward position on the pressure side slashface 126. When viewed from the pressure side of the platform 110, the arc may be concave. Further, as illustrated most clearly in FIG. 7, the curvature of the arc may correspond in shape to the profile of the contour of the pressure face 106 of the airfoil 102, (i.e., the shape of the airfoil 102 when viewed from the perspective of FIG. 7). More specifically, the arc may have approximately the same shape as the pressure face 106 of the airfoil 102 at the location where the pressure face 106 of the airfoil 102 intersects the platform 110. It will be appreciated that this preferred arrangement provides exceptional coolant distribution and coverage, as discussed in more detail below. In preferred embodiments, the main plenum 132 is formed such that it extends across a substantial portion of the platform 110. One manner in which this may be defined is to compare the axial length of the main plenum 132 with the axial length of the airfoil 102. In preferred embodiments, the main plenum 132 has an axial length of at least 0.75 of the axial length of the airfoil 102. This type of axial length provides convenient distribution of coolant through the entire interior of the platform 110 alone the pressure side of the rotor blade.

In some embodiments, the main plenum 132 includes a main plenum outlet 133 at one or more locations along the pressure side slashface 126. In a preferred embodiment, as shown, the main plenum 132 may include an outlet 133 at an aft position on the pressure side slashface 126 as well as an outlet 133 at a forward position on the pressure side slashface 126. Each of the main plenum outlets 133 may be formed such that it has a cross-sectional flow area that is less than the cross-sectional flow area of the main plenum 132, as illustrated. As discussed in more detail below, this may be done for a couple of reasons. First, the cross-sectional flow area may be reduced to impinge the coolant exiting through these outlet locations. This, as one of ordinary skill in the art will appreciate, may result in the exiting coolant having a desired coolant impingement characteristic, such as increasing the exit velocity of the coolant so that the cooling effect the resulting coolant stream is enhanced.

Second, the cross-sectional flow area of the main plenum outlets 133 may be reduced because of the size of the main plenum 132 and the need to evenly distribute coolant throughout the interior of the platform 110. That is, the main plenum 132 is designed to distribute coolant to the several cooling apertures 136 with little pressure loss. To accomplish this, the cross-sectional flow area of the main plenum 132 typically is significantly larger than the cross-sectional flow area of the cooling apertures 136. It will be appreciated that if the main plenum outlets 133 were not reduced in size compared to the size of the main plenum 132, an inordinate amount of coolant would exit the platform 110 through the main plenum outlet 133 and the supply of coolant available to the cooling apertures 136 would be likely insufficient. The main plenum outlets 133, thus, may be sized to have a cross-sectional flow area that corresponds to a desired metering characteristic. A "desired metering characteristic," as used herein, refers to a flow area through the coolant passageway that corresponds or results in a desired distribution of coolant or expected distribution of coolant through the several coolant passageways and/or the outlets that are formed along the pressure side slashface 126.

In some embodiments, a plug 138 may be used to reduce the cross-sectional flow area of the main plenum outlets 133, as illustrated. The plug 138 may be formed such that, upon installation, it reduces the cross-sectional flow area through the cooling passage in which it resides. In this case, the plug 138 is configured to allow a desired level of flow through the passage and directs the remainder through alternative routes, as desired. Herein, plugs of this type will be referred to "as partial plugs." Accordingly, the partial plug 138 may be configured to be inserted into the main plenum outlet 133 and reduce its cross-sectional flow area by blocking a portion of the flow area through the outlet 133. The partial plug 138 may be designed so that it reduces the flow area to a desired or predetermined flow area. In one preferred embodiment, the partial plug 138 is formed with a central aperture such that it formed an approximate "doughnut" shape. The central aperture is formed to provide the desired flow area through the outlet 133. As stated above, the predetermined flow area may relate to a desired coolant impingement characteristic and/or a desired metering characteristic, as one of ordinary skill in the art will appreciate. The partial plug 138 may be made of conventional materials and installed using conventional methods (i.e., welding, brazing, etc.). Once installed, an outer face of the partial plug 138 may reside flush in relation to the surface of the pressure side slashface 126.

The supply plenum 134 may extend in an approximate circumferential direction between the main plenum 132 and the interior cooling passage 116. In one preferred embodiment, the supply plenum 134 extends in an approximate circumferential direction from the pressure side slashface 126 to the interior cooling passage 116 and, therebetween, the supply plenum 134 bisects the main plenum 132. It will be appreciated that the supply plenum 134 provides a passageway for an amount of coolant to flow from the interior cooling passage 116 and the main plenum 132. In some embodiments, the supply plenum 134 may include a supply plenum outlet 135 at the pressure side slashface 126. Similar to the main plenum outlet 133, the supply plenum outlet 135 may be configured to have a reduced cross-sectional flow area, i.e., a cross-sectional flow area or flow area that is reduced from the cross-sectional flow area of the supply plenum 134. Also, a partial plug 138 may be used to reduce the cross-sectional flow area of the supply plenum outlet 135. Reducing the cross-sectional flow area of the supply plenum outlet 135 may be done for much the same reasons as the main plenum outlet 133. That is, the cross-sectional flow area may be reduced such that a desired coolant impingement characteristic is achieved, or the cross-sectional flow area may be reduced such that a desired metering characteristic is achieved.

In a preferred embodiment, the supply plenum outlet 135 may be configured such that it has an axial position on the pressure side slashface 126 that coincides with the approximate axial midpoint of the pressure side of the platform 110, as illustrated. In this case, at least a plurality of the cooling apertures 136 may be formed forward of the supply plenum 134 and at least a plurality of cooling apertures 136 may be formed aft of the supply plenum 134. In one preferred embodiment, at least four of the cooling apertures 136 are formed forward of the supply plenum 134 and at least a four cooling apertures 136 are formed aft of the supply plenum 134. In one embodiment, the supply plenum 134 may be approximately parallel to the forward edge 124 and the aft edge 121 of the platform 110.

The cooling apertures 136 may be configured such that each extends from the pressure side slashface 126 to a connection with the main plenum 132. The cooling apertures 136 may extend from the pressure side slashface 126 to the main plenum 132 in an approximate circumferential direction and may be approximately parallel to the supply plenum 134. The cooling apertures 136 also may be approximately parallel to the forward edge and the aft edge of the platform 110. As shown, the cooling apertures 136 may be linear. In a preferred embodiment, the cooling apertures 136 have smaller cross-sectional flow areas than the main plenum 132 and/or the supply plenum 134. It will be appreciated that the cooling apertures 136 may be configured such that, during operation, each aperture 136 exhausts a flow of coolant into a slashface cavity that is formed between adjacent installed rotor blades 100. The cooling apertures 136 may be narrow so that the released coolant is impinged and directed with relatively high velocity against the slashface of the neighboring turbine blade 100, which generally increases the cooling effectiveness of the coolant. It will be appreciated that the slashface cavity and the slashfaces that define them are difficult regions of the platform 110 to cool, and that cooling apertures 136 configured in the manner may provide effective cooling to this area. Though not shown, plugs 136 may be installed in one or more of the cooling apertures 136 to improve coolant distribution or impingement characteristics as necessary. In one embodiment, the plugs 136 may completely block the cooling apertures so that coolant does not escape through the slashface.

Referring now to FIG. 10, an alternative embodiment according to the present invention is provided: a platform cooling configuration 145. As shown, in this case, the supply plenum 134 extends from the suction side slashface 122 instead of the pressure side slashface 126. That is, the supply plenum 134 extends in approximate circumferential direction from a suction side slashface 122 to a connection made with the main plenum 132 and, between the suction side slashface 122 and the main plenum 132, the supply plenum 134 may bisect the interior cooling passage 116. In some embodiments, the supply plenum 134 may include a plug 139 that it is configured to substantially prevent coolant from exiting the supply plenum 134 along the suction side slashface 122. In this manner, the main plenum 132 may be connected to the interior cooling passage 116 via a passage formed through the suction side slashface 122, and all of the coolant flowing through supply plenum 134 may be directed to the main plenum 132, where it may be distributed to the several cooling apertures 136 on the pressure side of the platform 110. More particularly, to adequately distribute coolant across the several cooling apertures 136, it may be required to block substantially all coolant from exiting through the opening formed in the suction side slashface 122. FIG. 10 reflects this configuration, as this potential outlet is plugged with a plug 138 that completely blocks it (which will be referred to herein as a "full plug"). In an alternate embodiment, the plug 138 for the supply plenum 134 on the suction side 122 of the platform 110 may be a partial plug such that a desired amount of coolant is ejected at this location.

In addition, as shown in FIG. 10, the cooling apertures 136 may be curved. In one embodiment, the cooling apertures 136 form arcing curves between pressure side slashface 126 and the main plenum 132. It will be appreciated that the curvature of the cooling apertures 136 increases the path each makes between the main plenum 132 and the pressure side slashface 126, which increases the internal platform surface over which the coolant passes and, thereby, increases the exchange of heat between the coolant and the platform 110.

The present invention further includes a novel method of forming interior cooling channels within the platform region of a rotor blade in a cost-effective and efficient manner. Referring to flow diagram 200 of FIG. 11, as an initial step 202, the main plenum 132 may be formed in the pressure side of the platform 110. It will be appreciated that, because of the relatively uncomplicated shape of the main plenum 132, it may be cost-effectively formed using conventional casting processes. Thus, as discussed in more detail below, the expensive casting processes that must be used to form intricate designs may be avoided.

Once the main plenum 132 is formed, at a step 204, the supply plenum 134 may be machined. Specifically, the supply plenum 134 may be formed using a conventional line-of-sight machining or drilling process from a highly accessible location (i.e., either the suction side slashface 122 or the pressure side slashface 126). As a step 206, the cooling apertures 136 may be formed similarly using a conventional line-of-sight machining or drilling process. Again, the machining process may be initiated from an accessible location (i.e., the pressure side slashface 126).

Separately, as necessary, partial or full plugs 138 may be fabricated at a step 208. As discussed above, the partial plugs 138 may have several different configurations and function to reduce the flow area of an outlet. The full plug 138 may be formed to completely block the flow area of the outlet. The partial plugs 138 and plugs 139 may be fabricated from conventional materials.

Finally, at a step 210, the plugs 138, 138 may be installed in predetermined locations. This may be done using conventional methods, such as welding, brazing, or mechanical attachment.

In operation, it will be appreciated that the main plenum 132, the supply plenum 134, and the cooling apertures 136 may be configured to direct a supply of coolant from the interior cooling passage 116 to a plurality of outlets formed on the pressure side slashface 126. More particularly, the platform cooling arrangement of the present invention extracts a portion of the coolant from the cooling passages 116, uses the coolant to remove heat from the platform 110, and then expels the coolant in the slashface cavity formed between neighboring rotor blades 100 such that the coolant is used to cool the slashface cavity of the neighboring blades 100, as well as reducing the ingestion of hot gas path fluids. The present invention provides a mechanism to actively cool the platform region of a combustion turbine rotor blade by efficiently forming a complex, effective cooling arrangement using a series of cost-effective, conventional techniques. As stated, this region is typically difficult to cool and, given the mechanical loads of the area, is a location that receives high distress, particularly as engine firing temperatures are further increased. Accordingly, this type of active platform cooling is a significant enabling technology as higher firing temperatures, increased output, and greater efficiency are sought. Further, it will be appreciated that the usage of post-cast processes in the formation of the platform cooling channels provides greater flexibility to redesign, reconfigure, or retrofit platform cooling arrangements. Finally, the present invention teaches the simplified/cost-effective formation of platform cooling channels that have complex geometries and effective platform coverage. Whereas before, complex geometries necessarily meant a costly investment casting process or the like, the present application teaches methods by which cooling channels having complex design may be formed through machining and/or simplified casting processes.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, along a side that coincides with a pressure side of the airfoil, a pressure side of the platform comprises a planar topside extending circumferentially from the airfoil to a pressure side slashface, and along a side that coincides with a suction side of the airfoil, a suction side of the platform comprises a topside extending circumferentially from the airfoil to a suction side slashface, the platform cooling arrangement comprising:
  a main plenum residing just inboard of the planar topside of the pressure side of the platform and extending from an aft position to a forward position within the pressure side of the platform, the main plenum having a longitudinal axis that is approximately parallel to the planar topside of the pressure side of the platform;
  a supply plenum that extends between the main plenum and the interior cooling passage; and
  a plurality of cooling apertures, each cooling aperture extending from the pressure side slashface to a connection with the main plenum,
  wherein:
    the main plenum extends from an aft position to a forward position within the pressure side of the platform; and
    from an aft position on or in proximity to the pressure side slashface to a forward position on or in proximity to the pressure side slashface, the main plenum forms an arc, the arc curvature corresponding in shape to the contour profile of the pressure side of the airfoil.

2. The platform cooling arrangement according to claim 1, wherein the main plenum comprises an axial length of at least 0.75 of the axial length of the airfoil.

3. The platform cooling arrangement according to claim 1, wherein the main plenum comprises an outlet at the aft position on the pressure side slashface and an outlet at the forward position on the pressure side slashface; and
  wherein the main plenum outlet at both the aft position and forward position comprises outlets of reduced cross-sectional flow area.

4. The platform cooling arrangement according to claim 3, wherein the outlet at the aft position of the main plenum comprises a plug, the plug forming the reduced cross-sectional flow area of the outlet; and
  wherein each of the main plenum outlets of reduced cross-sectional flow area comprises a predetermined cross-sectional flow area, the predetermined cross-sectional flow area corresponding to a desired coolant impingement characteristic.

5. The platform cooling arrangement according to claim 4, wherein the predetermined cross-sectional flow area of the main plenum outlets further corresponds to a desired metering characteristic.

6. The platform cooling arrangement according to claim 1, wherein the supply plenum extends in an approximate circumferential direction from the pressure side slashface to the interior cooling passage and, therebetween, bisects the main plenum;
  wherein the supply plenum comprises an outlet at the pressure side slashface; and
  wherein the supply plenum outlet comprises an outlet of reduced cross-sectional flow area.

7. The platform cooling arrangement according to claim 6, wherein, at the pressure side slashface, the supply plenum comprises a plug, the plug forming the reduced cross-sectional flow area of the outlet; and
  wherein the supply plenum outlet of reduced cross-sectional flow area comprises a predetermined flow area, the predetermined flow area corresponding to a desired coolant impingement characteristic.

8. The platform cooling arrangement according to claim 7, wherein the predetermined flow area of the supply plenum outlet further corresponds to a desired metering characteristic.

9. The platform cooling arrangement according to claim 6, wherein the axial position of the supply plenum outlet on the pressure side slashface comprises the approximate axial midpoint of the pressure side of the platform;
  wherein at least a plurality of the cooling apertures are formed forward of the supply plenum and at least a plurality of cooling apertures are formed aft of the supply plenum; and
  wherein a plurality of the cooling apertures comprise plugs.

10. The platform cooling arrangement according to claim 9, wherein at least four of the cooling apertures are formed forward of the supply plenum and at least a four cooling apertures are formed aft of the supply plenum.

11. The platform cooling arrangement according to claim 1, wherein the supply plenum extends in an approximate circumferential direction from the suction side slashface to the main plenum and, therebetween, bisects the interior cooling passage.

12. The platform cooling arrangement according to claim 11, wherein, at the suction side slashface, the supply plenum comprises a plug, the plug being formed to substantially prevent coolant from exiting the supply plenum along the suction side slashface.

13. The platform cooling arrangement according to claim 6, wherein the cooling apertures extend from the pressure side slashface to the main plenum in an approximate circumferential direction.

14. The platform cooling arrangement according to claim 13, wherein the cooling apertures are one of linear and curved; and
wherein the cooling apertures comprise smaller cross-sectional flow areas than the main plenum and the supply plenum.

15. The platform cooling arrangement according to claim 13, wherein the cooling apertures are configured such that, during operation, each exhausts an impinged flow of coolant into a slashface cavity that is formed between adjacent installed rotor blades.

* * * * *

UNITED STATES PATENT AND TRADEMARK OFFICE
CERTIFICATE OF CORRECTION

PATENT NO. : 8,851,846 B2  
APPLICATION NO. : 12/894878  
DATED : October 7, 2014  
INVENTOR(S) : Ellis et al.

It is certified that error appears in the above-identified patent and that said Letters Patent is hereby corrected as shown below:

In the Specification

In Column 3, Line 9, delete "blade 110" and insert -- blade 100 --, therefor.

In Column 7, Lines 13-14, delete "main plenum 134" and insert -- main plenum 132 --, therefor.

In Column 10, Line 31, delete "plugs 138" and insert -- plugs 139 --, therefor.

In Column 10, Lines 32-33, delete "plugs 138" and insert -- plugs 139 --, therefor.

Signed and Sealed this  
Thirty-first Day of March, 2015

Michelle K. Lee  
*Director of the United States Patent and Trademark Office*